(12) United States Patent
Kashihara

(10) Patent No.: US 8,173,733 B2
(45) Date of Patent: May 8, 2012

(54) METHOD OF PRODUCING AQUEOUS RESIN COMPOSITION

(75) Inventor: Kenji Kashihara, Takasago (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 12/795,552

(22) Filed: Jun. 7, 2010

(65) Prior Publication Data

US 2010/0249318 A1    Sep. 30, 2010

Related U.S. Application Data

(63) Continuation of application No. 11/995,848, filed as application No. PCT/JP2006/314506 on Jul. 21, 2006, now abandoned.

(30) Foreign Application Priority Data

Jul. 22, 2005   (JP) ................................. 2005-212536

(51) Int. Cl.
*C08K 5/06*      (2006.01)
(52) U.S. Cl. ...................... 524/376; 524/276; 524/556

(58) Field of Classification Search .................. 524/276, 524/376, 556
See application file for complete search history.

(56) References Cited

U.S. PATENT DOCUMENTS

| | | | |
|---|---|---|---|
| 6,777,096 B2 * | 8/2004 | Shiba et al. ................... | 428/463 |
| 7,511,107 B2 * | 3/2009 | Fechtenkotter et al. ...... | 526/323 |
| 2003/0187128 A1 * | 10/2003 | Shiba et al. ................... | 524/556 |

* cited by examiner

*Primary Examiner* — David Wu
*Assistant Examiner* — Marie Reddick
(74) *Attorney, Agent, or Firm* — Marvin A. Motsenbocker; Mots Law, PLLC

(57) ABSTRACT

A polyolefin wax-containing aqueous resin composition that can provide excellent properties without the use of a surfactant is provided. The aqueous resin composition is obtained by heating and dissolving 100 parts by mass of a carboxyl group-containing polyolefin wax in the presence of 15 to 67 parts by mass of a compound that satisfies formula (1) shown below, and 90 to 380 parts by mass of water, and then dispersing this with a basic compound that has been added at a ratio of 1 to 4 chemical equivalents per carboxyl group of the carboxyl group-containing polyolefin wax. $C_mH_{2m+1}$—$(OCH_2CH_2)_n$—OH Formula (1) m: an integer from 4 to 6, n: an integer from 1 to 4.

9 Claims, No Drawings

METHOD OF PRODUCING AQUEOUS RESIN COMPOSITION

CROSS REFERENCE TO RELATED APPLICATION

This application is a continuation of application Ser. No. 11/995,848, filed on Feb. 15, 2008 now abandoned, which is based upon and claims the benefit of priority from the prior International Application No. PCT/JP2006/314506, filed on Jul. 21, 2006, which is based upon and claims the benefit of priority from the prior Japanese Patent Application No. JP2005-212536, filed on Jul. 22, 2005; the entire contents of these are incorporated herein by reference.

TECHNICAL FIELD

The present invention relates to an aqueous emulsion of polyolefin-based wax.

BACKGROUND ART

Aqueous polyolefin-based wax emulsions are generally used in a wide array of fields as ink, adhesive, aqueous coating material, floor polish, fiber processing agent, paper processing agent, mold releasing agent, and the like, either alone or in combination with other resin emulsions.

The aqueous polyolefin wax emulsion is produced by methods such as a method of mechanical pulverization, a method of blasting and pulverizing under high pressure, a method of spraying from a pore, a method in which wax is dissolved in a solvent, which is then emulsified by a high pressure homogenizer, and the solvent is removed, a method in which wax is heated to not less than its melting point, which is then emulsified by a high pressure homogenizer, and the like.

However, the methods as listed above require special equipment, or a step of removing solvents, and thus they are not useful in industrial applications.

Accordingly, methods of producing an aqueous resin composition that contains a surfactant conventionally have been proposed as easy and convenient methods of producing emulsions (see Patent Documents 1 and 2)

However, aqueous resin compositions obtained by these conventional production methods contain surfactants, and thus have the problem that the aqueous resin compositions after dried do not realize their expected properties such as water-resistance.

Patent Document 1: JP 2001-253946A
Patent Document 2: JP 2002-69302A

DISCLOSURE OF THE INVENTION

The present invention was arrived at in light of the above matters, and it is an object thereof to provide a polyolefin wax-containing aqueous resin composition that can provide excellent properties without the use of a surfactant.

The inventors of the present application performed intense investigation regarding the foregoing issue, and found that it is possible to solve the foregoing issue by mixing a carboxyl group-containing polyolefin wax, a compound that satisfies general formula (1) shown below, and water, while heating, and then adding a predetermined amount of a basic compound and dispersing the resin. Based on this finding, the present invention has been accomplished.

In other words, the present invention provides an aqueous resin composition that is formed by heating and dissolving 100 parts by mass of a carboxyl group-containing polyolefin wax in the presence of 15 to 67 parts by mass of a compound that satisfies general formula (1) shown below, and 90 to 380 parts by mass of water, and then dispersing this with a basic compound that has been added at a ratio of 1 to 4 chemical equivalents per carboxyl group of the carboxyl group-containing polyolefin wax.

$$C_mH_{2m+1}—(OCH_2CH_2)_n—OH \qquad \text{General Formula (1)}$$

m: an integer from 4 to 6, n: an integer from 1 to 4

BEST MODE FOR CARRYING OUT THE INVENTION

The present invention is described in detail below.

The carboxyl group-containing polyolefin wax that is used in the present invention is obtained by, for example, graft-copolymerizing at least one species selected from an $\alpha,\beta$-unsaturated carboxylic acid and anhydrides thereof with at least one species selected from among a polypropylene wax, a propylene-$\alpha$-olefin copolymer wax, a polyethylene wax, and an ethylene-$\alpha$-olefin copolymer wax.

As used herein, the propylene-$\alpha$-olefin copolymer wax is a wax obtained by copolymerizing propylene as the main component with $\alpha$-olefin. Examples of $\alpha$-olefins include $\alpha$-olefins with 2 or 4 to 20 carbon atoms, such as ethylene, 1-butene, 1-pentene, 1-hexene, 1-heptene, 1-octene, 1-decene, 1-dodecene, 1-hexadecene, and 4-methyl-1-pentene. The propylene content of the propylene-$\alpha$-olefin copolymer is preferably not less than 50 mol %. When the content of the propylene component is less than 50 mol %, the adherence to polypropylene base becomes poor.

Further, the ethylene-$\alpha$-olefin copolymer wax is a wax obtained by copolymerizing ethylene as the main component with $\alpha$-olefin. Examples of the $\alpha$-olefin include $\alpha$-olefins with 3 to 20 carbon atoms, such as propylene, 1-butene, 1-pentene, 1-hexene, 1-heptene, 1-octene, 1-decene, 1-dodecene, 1-hexadecene, and 4-methyl-1-pentene. The ethylene content of the ethylene-$\alpha$-olefin copolymer wax is preferably not less than 50 mol %. When the content of the ethylene component is less than 50 mol %, the adherence to polyethylene base becomes poor.

Examples of the $\alpha,\beta$-unsaturated carboxylic acid and acid anhydrides thereof that are graft-polymerized with the olefin wax include maleic acid, maleic anhydride, fumaric acid, citraconic acid, citraconic anhydride, mesaconic acid, itaconic acid, itaconic anhydride, aconitic acid, aconitic anhydride, and himic anhydride. Of these, maleic anhydride and itaconic anhydride are preferable.

The polyolefin wax may be modified with acid. In this case, the content of the $\alpha,\beta$-unsaturated carboxylic acid and acid anhydride component thereof in the acid-modified polyolefin wax is preferably 10 to 110 mgKOH/g. When the content is over 110 mgKOH/g, the hydrophilicity of the resin is high and there is a risk that the water-resistance of the coating film that is obtained from the target composition will be poor. On the other hand, dispersion of the resin becomes difficult when the content is less than 10 mgKOH/g.

As the method of graft-copolymerization of at least one species selected from $\alpha,\beta$-unsaturated carboxylic acids and anhydrides thereof with a polyolefin wax, well-known methods can be used, such as the method of heating and melting the polyolefin wax to not less than its melting point in the presence of a radical generator in order to effect the reaction (melting method), and the method of dissolving the polyolefin wax in an organic solvent and then heating and mixing the two in the presence of a radical generator in order to effect the reaction (solution method).

Further, the polyolefin wax may be those having been subjected to oxidation treatment in order to introduce a carboxyl group. In this case, as the method of oxidation treatment to introduce a carboxyl group into the polyolefin wax, well-known methods can be used such as a method in which the polyolefin wax is heated and melted to not less than its melting point, and air, oxygen and ozone are blown thereinto for oxidation.

The carboxyl group content of the carboxyl group-containing polyolefin wax obtained by the oxidation treatment is preferably 10 to 110 mgKOH/g. When the content is over 110 mgKOH/g, the hydrophilicity of the resin is high and there is a risk that the water-resistance of the coating film that is obtained from the target composition will be poor. On the other hand, dispersion of the resin becomes difficult when the content is less than 10 mgKOH/g.

The melt viscosity at 170° C. of the carboxyl group-containing polyolefin wax is preferably not more than 30,000 mPa·s. When the melt viscosity is over 30,000 mPa·s, the resin solubility is poor and thus dispersion becomes poor.

The glycol ether-based compound satisfying the general formula (1) that is used in the present invention is used in an amount of 15 to 67 parts by mass per 100 parts by mass of the carboxyl group-containing polyolefin wax. When the amount is below 15 parts by mass, dispersion of the resin becomes difficult. On the other hand, when the amount is greater than 67 parts by mass, drying of the target composition may require a high temperature and a longer length of time. Further, the original objective of dispersing the compound in an aqueous medium can be lost.

Examples of the glycol ether-based compound that satisfies general formula (1) include ethylene glycol mono-n-butyl ether, ethylene glycol mono-iso-butyl ether, ethylene glycol mono-tert-butyl ether, diethylene glycol mono-n-butyl ether, diethylene glycol mono-iso-butyl ether, triethylene glycol mono-n-butyl ether, tetraethylene glycol mono-n-butyl ether, ethylene glycol mono-n-butyl ether, diethylene glycol mono-n-butyl ether, ethylene glycol mono-2-ethylhexyl ether, and ethylene glycol mono-2-ethylhexyl ether.

These compounds can be used as a single species or in combination of two or more species.

In this invention, a basic compound is necessary to disperse the acid-modified chlorinated polyolefin. The dispersibility of the acid-modified chlorinated polyolefin can be increased by having a basic compound present in the system. Examples of the basic compound include: inorganic basic compounds such as sodium hydroxide, potassium hydroxide, sodium carbonate, potassium carbonate, and ammonium carbonate; amines such as triethylamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, methyliminobispropylamine, 3-methoxypropylamine, monoethanolamine, diethanolamine, triethanolamine, morpholine, N-methylmorpholine, N-ethylmorpholine, 2-amino-2-methyl-1-propanol, and 2-dimethylamino-2-methyl-1-propanol; and ammonium.

The amount of the basic compound that is added is preferably 1 to 4 chemical equivalents per carboxyl group of the polyolefin wax. When the amount is less than 1 chemical equivalent, dispersion becomes difficult. When the amount is greater than 4 chemical equivalents, there is a risk that too much will remain in the dried target compound.

The amount of water that is used when dispersing the polyolefin wax is 90 to 380 parts by mass. When the amount is less than 90 parts by mass, dispersion becomes difficult. On the other hand, when the amount is greater than 380 parts by mass, drying of the target composition may require high temperatures and a longer length of time.

The aqueous resin composition of the present invention is produced by heating to dissolve 100 parts by mass of the carboxyl group-containing polyolefin wax in the presence of 15 to 67 parts by mass of the glycol ether-based compound that satisfies general formula (1), and 90 to 380 parts by mass of water, and then adding the basic compound at a ratio of 1 to 4 chemical equivalents per carboxyl group of the carboxyl group-containing polyolefin wax.

The temperature when heating to dissolve the carboxyl group-containing polyolefin wax in the presence of the glycol ether-based compound that satisfies general formula (1) and water is 90 to 180° C., and preferably 100 to 160° C.

Next, the basic compound is added to the above dissolved material to disperse the resin. The temperature when adding the basic compound is preferably 90 to 160° C.

Once the basic compound has been added, it is necessary to stir while heating in order to sufficiently disperse the resin. The temperature when stirring is preferably 90 to 160° C. The stirring time is 30 minutes to 6 hours, preferably 1 to 4 hours.

With the present invention, it is possible to provide an aqueous resin composition that has excellent properties and contains no surfactant. This aqueous resin composition can be obtained without requiring special equipment or complicated processing steps, and thus is useful in industrial applications.

EXAMPLES

Next, the present invention is described in specific terms through examples, but the present invention is not limited by these examples.

In the description below, measurement of the mean particle size was carried out using Zetasizer Nano ZS, available from MALVERN, serving as a laser diffraction-type particle size distribution measurement device.

Production Example 1

Polypropylene-ethylene copolymer (ethylene component content=3 mol %) 420 g, maleic anhydride 105 g, di-tert-butyl peroxide 7 g, and toluene 280 g were placed into an autoclave with attached agitator and nitrogen substitution was performed for approximately 5 minutes, after which they were reacted at 140° C. for 5 hours while heating and stirring. After the reaction was over, the reaction solution was introduced into a large quantity of acetone to precipitate the resin. This resin was further washed several times with acetone to remove unreacted maleic anhydride. The resultant was then dried under reduced pressure, yielding a maleic anhydride-modified polypropylene wax with a carboxyl group content of 57 mgKOH/g and a melt viscosity at 170° C. of 25,800 mPa·s.

Working Example 1

Production of Aqueous Resin Composition (a)

Two hundreds g of the maleic anhydride-modified propylene-ethylene copolymer wax obtained in Production Example 1, 36 g of ethylene glycol mono-2-ethylhexyl ether, and 400 g of deionized water were introduced into an autoclave furnished with a stirrer, and this was maintained at 120°

C. and stirred for two hours in order to sufficiently dissolve the resin. This solution was cooled to 100° C., and then 23 g of N,N-dimethylethanolamine was added. This was stirred for two hours and then cooled, yielding an aqueous resin composition (a) with a resin concentration (solid content) of 30 mass % and a 48 nm mean particle size.

Working Example 2

Production of Aqueous Resin Composition (b)

An aqueous resin composition (b) with a resin concentration (solid portion) of 30 mass % and a mean resin particle size of 77 nm was obtained in the same manner as in Working Example 1, except that the amount of each component was changed to the composition of Table 1.

Working Example 3

Production of Aqueous Resin Composition (c)

An aqueous resin composition (c) with a resin concentration (solid content) of 30 mass % and a mean particle size of 35 nm was obtained in the same manner as in Working Example 1, except that the amount of each component was changed to the composition of Table 1.

Comparative Example 1

Production of Aqueous Resin Composition (d)

Two hundreds g of the maleic anhydride-modified polypropylene wax obtained in Production Example 1, 54 g of nonylphenol ethylene oxide 11-mol adduct (product name: Noigen EA-140, available from Daiichi Kogyo Seiyaku Co., Ltd., HLB=14), 21 g of 48% potassium hydroxide aqueous solution, 3 g of sodium sulfite, and 610 g of deionized water were introduced into an autoclave furnished with a stirrer, and this was heated to 150° C. After the heating, this was stirred for one hour and then cooled to room temperature, yielding an aqueous resin composition (d) with a resin concentration (solid content) of 30 mass % and a 180 nm mean particle size.

Comparative Example 2

Production of Aqueous Resin Composition (e)

Production of an aqueous resin composition (e) in the same manner as in Working Example 1 was attempted with the quantities of each component changed to the composition of Table 1. However, the small amount of glycol ether per the acid-modified chlorinated polyolefin did not permit dispersion to occur.

TABLE 1

| | | Working Example 1 | Working Example 2 | Working Example 3 | Comparative Example 1 | Comparative Example 2 |
|---|---|---|---|---|---|---|
| Aqueous resin composition | | (a) | (b) | (c) | (d) | (e) |
| Carboxyl group-containing polyolefin wax [g] | Production Example 1 | 200 | | | 200 | 200 |
| | Polypropylene oxide wax[1] | | 200 | | | |
| | Polyethylene oxide wax[2] | | | 200 | | |
| Ethylene glycol mono-n-butyl ether [g] | | 36 | | | | 24 |
| Diethylene glycol mono-n-butyl ether [g] | | | | 100 | | |
| Ethylene glycol mono-n-ethylhexyl ether [g] | | | | 45 | | |
| Deionized water [g] | | 400 | 410 | 380 | 610 | 410 |
| N,N-dimethylethanolamine [g] | | 23 | 20 | 40 | | 23 |
| Nonylphenol ethylene oxide [g] | | | | | 54 | |
| 48% potassium hydroxide aqueous solution [g] | | | | | 21 | |
| Sodium sulfite [g] | | | | | 3 | |
| Mean particle size [nm] | | 48 | 77 | 35 | 180 | No dispersion |

The aqueous resin compositions (a) through (d) thus obtained were evaluated as follows. The results are shown in Table 2.

Peel Strength Test

The aqueous resin composition was applied onto an untreated polypropylene film and an untreated polyethylene film, respectively, by a bar coater such that the dried film had a thickness of 5 μm, followed by drying at 80° C. Then, the film was heat-sealed to another film of the same type at 120° C. with 1 kgf/cm², forming the test piece. This test piece was subjected to peel strength measurement using Tensilon with a pulling rate of 20 cm/min.

Water Resistance

The aqueous resin composition was applied onto a glass plate using a 50 μm applicator, and then dried at room temperature for 12 hours, forming the test piece. This test piece was immersed in warm water held at 60° C. for 24 hours, and then the condition of the test piece was observed.

Storage Stability

Eighty g of the aqueous resin composition was sealed in a 100-mL container and left undisturbed for two weeks in a 50° C. atmosphere, and the change in its viscosity was assessed based on the following testing standards.

Open Circle: slight increase in viscosity (viscosity not more than twice the initial viscosity)

X-Mark: increase in viscosity (rise in viscosity being not less than twice the initial viscosity)

TABLE 2

| Aqueous resin composition | Peel strength test [gf/cm] | | Water resistance | Storage stability |
|---|---|---|---|---|
| | Untreated PP film | Untreated PE film | | |
| Working Example 1 (a) | 320 | 140 | No change | ○ |
| Working Example 2 (b) | 290 | 130 | No change | ○ |
| Working Example 3 (c) | 120 | 310 | No change | ○ |
| Comparative Example 1 (d) | 60 | 40 | Coating film whitened | ○ |

It can be understood from Table 2 that the aqueous resin compositions (a) and (c) exhibit good adherence, and also have excellent water resistance and storage stability.

In contrast, the aqueous resin composition (d) containing a surfactant is lacking in both adherence and water resistance.

Industrial Applicability

The aqueous resin composition containing polypropylene-based wax can be used as ink, adhesive, aqueous coating material, floor polish, fiber processing agent, paper processing agent, mold releasing agent, and various binders.

The invention claimed is:

1. A method of producing an aqueous resin composition consisting of the following steps:

heating and dissolving 100 parts by mass of a carboxyl group-containing polyolefin wax in the presence of 15 to 67 parts by mass of a compound that satisfies Formula (1) below, and 90 to 380 parts by mass of water to provide an aqueous medium, dispersing the wax in the aqueous medium by adding a basic compound at a ratio of 1 to 4 basic group equivalents per carboxyl group of the carboxyl group-containing polyolefin wax and then mixing:

m: an integer from 4 to 6, n: an integer from 1 to 4.

2. The method of claim 1, wherein the step of heating and dissolving the polyolefin wax comprises heating at a temperature in the range of from 100 to 160 degrees Celsius.

3. The method of claim 1, wherein the step of dispersing by adding a basic compound comprises heating at a temperature in the range of from 90 to 160 degrees Celsius.

4. The method of claim 1, wherein the polyolefin wax and water are combined in a ratio of one to two.

5. The method of claim 1, wherein the compound that satisfies Formula (1) is added in an amount of between 15 to 22.5 parts by mass.

6. The method of claim 1, wherein the compound that satisfies Formula (1) is selected from the group consisting of ethylene glycol mono-n-butyl ether, diethylene glycol mono-n-butyl ether and ethylene glycol mono-n-ethylhexyl ether.

7. The method of claim 1, wherein the carboxyl group-containing polyolefin wax is an acid-modified polyolefin wax which has an acid value of 10 to 110 mgKOH/g and is obtained by graft-copolymerization of at least one species selected from the group consisting of α,β-unsaturated carboxylic acids and anhydrides thereof with a polyolefin wax.

8. The method of claim 1, wherein the carboxyl group-containing polyolefin wax has an acid value of 10 to 110 mgKOH/g through oxidation treatment of a polyolefin wax.

9. The method of claim 1, wherein the carboxyl group-containing polyolefin wax has a melt viscosity at 170° C. of not more than 30,000 m Pas.

* * * * *